April 19, 1932. W. S. WOLFE 1,854,388
METHOD OF MAKING RUBBER HEELS
Filed Sept. 26, 1929 2 Sheets-Sheet 1

Inventor
William S. Wolfe,
By Robert M. Pierson,
Attorney

Patented Apr. 19, 1932

1,854,388

UNITED STATES PATENT OFFICE

WILLIAM S. WOLFE, OF FAIRLAWN, OHIO, ASSIGNOR TO SEIBERLING RUBBER COMPANY, OF BARBERTON, OHIO, A CORPORATION OF DELAWARE

METHOD OF MAKING RUBBER HEELS

Application filed September 26, 1929. Serial No. 395,287.

This invention relates to the manufacture of rubber heels having a perforable nailing layer in the attaching face, particularly when such layer is an insert embedded in the cushion rubber or body of the heel.

An object of the invention is to provide an improved method and apparatus for forming and vulcanizing the heel components into a unitary structure in such manner that objectionable displacement of the attaching layer in the heel will be avoided, a saving of material effected, and an improved product obtained.

A further purpose in view is to attain these results in connection with a method of automatically filling the molds in an extruding machine.

This application includes the subject-matter of my prior application Serial No. 295,449, filed July 26th, 1928, together with additional matter, and is a continuation in part of said prior application.

Figure 1:
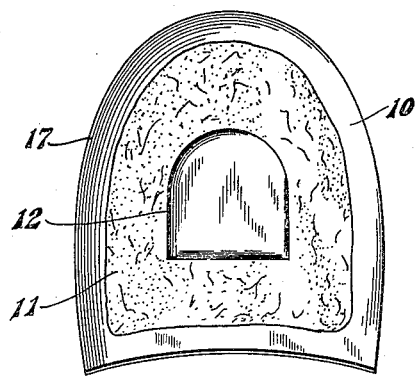
Fig. 1 is a plan view showing the attaching face of a rubber heel produced according to this invention.

While the nailing insert may be of any suitable character, it is desirably made of a composition of rubber and reinforcing material which will integrally unite with the heel body and, when vulcanized, will attain a leathery firmness capable of retaining the nail heads and imparting flexibility, non-spreading and other desirable characteristics to the heel. Such an insert, made of rubber intermixed with animal hair, is disclosed in Willis Patent No. 1,721,982 of July 23, 1929.

The incorporation in a rubber heel of such an element, or in fact, of any non-rigid face insert, cannot be satisfactorily accomplished by the ordinary methods and apparatus employed in heel manufacture and applicable to the embedment of metal washers, the incorporation of fibrous top lifts etc., where it has been customary to mold the heel with its tread side down in the molding cavity. My invention departs from former practice in this respect and in its preferred form includes the use of a mold cavity whose bottom wall is shaped to form the attaching face and is provided with means for anchoring the insert against displacement by the pressure of the body rubber. This displacing pressure occurs during the molding and vulcanizing operation and also in the filling of the mold when such filling is accomplished by progressive extrusion of plastic rubber into the mold cavity, accompanied by movement of the mold in its own plane across the end of the extruding nozzle.

Referring to the drawings, 10 is the cushion heel body made of any of the ordinary rubber compounds employed for heels, and 11 is the attaching layer or plug integrally vulcanized thereto and embedded or inset in the seating face of the heel, the attaching layer being made of a vulcanizable rubber compound reinforced to impart to said layer the necessary hardness or stiffness to retain the heads of the nails employed for attaching the heel to the shoe. A suitable reinforcing material for this purpose is animal hair such as hog hair, mixed with the rubber, but I may employ other materials for securing the desired degree of stiffness, and may otherwise vary the character of the insert 11.

Figure 2:
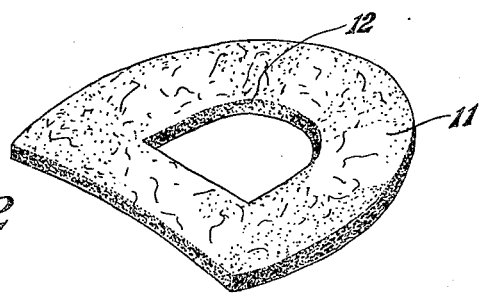
Fig. 2 is a perspective view showing the annular heel-shaped blank for the nailing insert.
Figure 3:
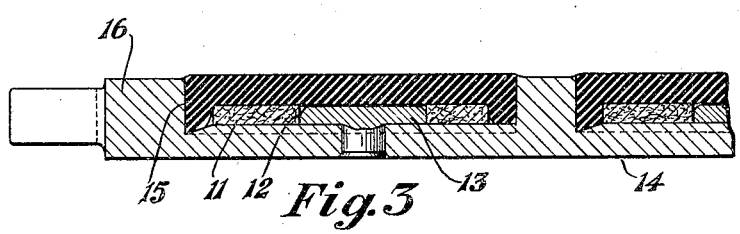
Fig. 3 is a sectional view showing part of the heel mold with the heel components assembled therein.
Figure 4:
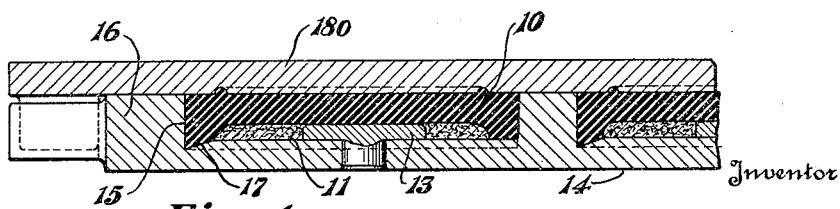
Fig. 4 is a sectional view showing the mold closed upon the heels to place the components under pressure.

The blank shown in Fig. 2 for forming the attaching plug or layer 11 may conveniently be cut by a die having the desired outline from a sheet of suitable thickness, and is formed with at least one recess or hole of relatively large size, the drawing indicating a single, large D-shaped, aperture or perforation 12, located centrally of the plug 11, and conforming substantially to the external outline of the latter, making a D-shaped or heel-shaped annulus of said plug.

The particular heel here illustrated forms the subject of my copending application Serial No. 295,450, filed July 26th, 1928.

The hole or opening 12 serves for locating the plug 11 upon a boss or projection 13 forming a part of a mold 14 having heel-shaped mold cavities 15. The dimensions of the projection 13 are preferably about the same as those of said opening 12, so that said projection will enter the opening and cling to the sides thereof when the plug is forced upon it, although the aperture 12 permissibly could be slightly larger in diameter than the projection 13 and compressed laterally against it by molding pressure. The upper edges or corners of the projection 13 are preferably beveled or rounded slightly in order to facilitate placing of the plug 11 in position.

The molding cavities 15 are cut in a metal plate 16 forming the body of the mold, and the bottoms of said cavities are shaped to form the attaching or seating faces of the heels. Usually these faces are more or less concave. The floor of the cavity is complementally convex and the attaching face of the heel in this instance is flat over most of its area and provided with a raised marginal lip 17 on the body rubber for obtaining a tight edge seating when the heel is fastened down on the shoe by means of nails which may be driven through the body rubber until their heads reach and press down against the insert 11. The top plate or cover 180 of the mold is shaped to form the tread surfaces of the heels, which may be generally flat and provided with raised markings forming a non-slip design, a brand name, etc.

In practicing my invention as thus far described, the annular insert plug 11 is placed on the bottom of the molding cavity and its central opening is fitted on the projection 13, so that the plug will be firmly supported and anchored in the mold against the displacing pressure of the body rubber. This rubber becomes softened by the heat of vulcanization and tends to flow in all directions to fill the molding cavity. Unless the insert is firmly anchored in the described or an equivalent manner, it is apt to become displaced by the molding pressure and produce a defective heel.

The body rubber 10 is assembled with the plug 11 at any suitable stage and in any desired manner. A died-out blank thereof may first be stuck to the plug and the two located in the mold as a unit, or the plug 11 may first be located in the mold and the body rubber placed thereover either as a preformed blank or as a measured quantity of rubber detached from a larger mass in the course of filling the mold by a machine method.

The automatic filling of the molds by a suitable machine greatly reduces the cost of the mold-charging operation, and the use of such a method, in connection with the other steps of my invention, constitutes the preferred mode of practicing the invention, although the molds could be filled by the slower hand method. When they are automatically filled as will now be set forth, the described mode of anchoring the nailing inserts assumes an additional importance in that it tends to hold said inserts in place against the heavy displacing pressures caused by extruding the plastic body rubber into the mold cavities and by moving the molds across the extruding nozzle.

Figure 5:
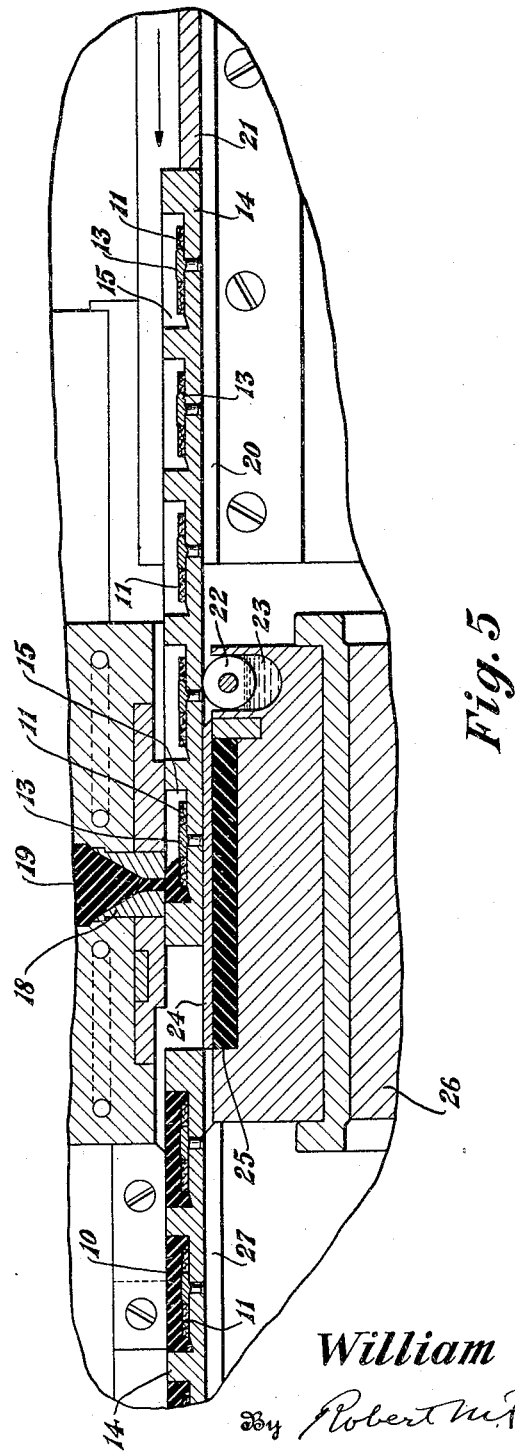
Fig. 5 is a fragmentary sectional view illustrating the action of a filling apparatus in charging the molds and avoiding displacement of the nailing inserts in accordance with my invention.

Referring to Fig. 5, 18 is the steam-heated nozzle of a mold-filling machine, the outlet slot of said nozzle having a narrow width in the direction of mold movement and a lateral length approximately as great as the width of the mold. 19 is a body of plastic rubber composition in said nozzle. The anterior portion of the nozzle chamber is funnel-shaped and forms part of a passage connected with a suitable forcing mechanism such as a pair of rollers (not shown). From nozzle 18 the rubber 19 is extruded into the mold cavities 15 as they pass beneath and across the end of said nozzle, and it progressively embeds the insert 11 in each cavity as indicated with respect to the mold cavity which is shown in the course of being filled in Fig. 5.

The molds are advanced in series in their own plane over a guide-way 20 by means of a reciprocating pusher 21. They pass over a roller 22 in a well 23 containing a lubricating liquid, and onto a brass bed-plate 24 which is backed by a vulcanized rubber cushion 25 carried by a supporting head 26 which may be lowered when it is desired to open the machine for cleaning etc. The successively filled molds are pushed onto another guide-way 27 on the delivery side, from which they may be removed to have their cover plates 180 applied, whereupon they are placed in a heating press, the heels are vulcanized in the usual manner and their components are consolidated and integrally united by the vulcanizing heat and the molding pressure.

The anchoring projections 13 on the floors of the mold cavities prevent the inserts 11 from drifting during both the filling and the molding operations, with the result that the production of defective heels because of misplaced inserts is largely overcome. The presence of the openings 12 of course saves a corresponding amount of material, and the stiffness of the vulcanized composition in the insert 11 avoids the spreading of the heel and its breathing action when in use, which are observed in a similarly recessed heel made of homogeneous cushion stock throughout.

It will be understood that the described steps and features of construction may be variously modified within the scope of my invention as defined in the claims.

I claim:

1. The method of making rubber heels which comprises anchoring a distortable, vulcanizable insert at the bottom of a mold cavity, progressively embedding the insert by extrusion of vulcanizable rubber composition into the mold cavity, holding the insert, by means of its anchorage, against substantial distortion and vulcanizing the heel in said mold cavity.

2. The method of making rubber heels which comprises forming a substantially flat, plastic attaching insert with a guide aperture therein, positioning said insert within and in face contact with the bottom of a complementally-formed mold cavity by the guiding action of the walls of said aperture upon the complemental mold part, and embedding said insert in the face of a body of rubber composition.

3. The method of making rubber heels which comprises forming an annular, substantially flat, vulcanizable attaching insert, anchoring said insert by means of the walls of its aperture in face contact with the bottom of a complementally-formed mold cavity, filling said mold cavity with a body of vulcanizable rubber composition to embed said insert in the face of said body, and vulcanizing the parts together in said mold cavity.

4. The method of making rubber heels which comprises forming an annular, longitudinally distortable vulcanizable attaching insert, anchoring said insert by means of the walls of its aperture within and at the bottom of a mold cavity, progressively filling said mold cavity and embedding the insert in the face of the heel, by extrusion into the cavity of vulcanizable rubber composition, accompanied by relative movement of the mold in its own plane, holding said insert, by means of its anchorage, against substantial distortion or displacement by the longitudinal pressure of the extruded rubber and vulcanizing the heel in said mold cavity.

In witness whereof I have hereunto set my hand this 23rd day of September, 1929.

WILLIAM S. WOLFE.